Feb. 23, 1965    C. S. BARNHART, SR    3,170,852
PROXIMITY SURFACE STILL
Filed June 22, 1962

INVENTOR.
CLYDE S. BARNHART, SR.
BY
ATTORNEY 3,170,852
PROXIMITY SURFACE STILL
Clyde S. Barnhart, Sr., 4718 Kenmore Ave.,
Alexandria, Va.
Filed June 22, 1962, Ser. No. 204,652
4 Claims. (Cl. 202—236)
(Granted under Title 35, U.S. Code (1952), sec. 266)

The invention described herein may be manufactured and used by or for the Government for governmental purposes without the payment to me of any royalty thereon.

The present invention relates to improvements in close proximity stills wherein means are provided for continuous operation between elongated evaporating and condensing surfaces in close proximity with one another.

Close proximity stills, where the evaporator and condenser surfaces are no greater than approximately one-eighth inch apart, are characterized by greater efficiency because a molecule of water leaving the evaporator surface as vapor meets with a minimal number of collisions with other molecules before striking the condenser surface where it assumes a liquid state. It is possible in a close proximity still for a given molecule to travel the entire distance between the evaporator and condenser surfaces without colliding with another molecule. However, as the distance between the evaporator and the condenser surfaces increase, there is a marked decrease in efficiency. As an example, assume that a cubical shaped still had a top surface as a condenser and a bottom surface as an evaporator and contained $n$ molecules of water vapor. In such a device, at any given moment, $n/6$ molecules of water vapor would be traveling towards the condenser inasmuch as molecules move at random in all directions and have frequent collisions. The efficiency of such a cubical shaped still would be approximately sixteen and two-thirds percent. In contrast by utilizing a close proximity still, thus virtually eliminating the motion of molecules moving in a direction perpendicular to that of the desired direction, i.e., between the evaporator and the condenser, there would be $n/2$ molecules of water moving towards the condenser, and the efficiency of the device would be approximately 50 percent. Further, if the distance between the evaporator surface and the condenser surface can be reduced to less than the average distance travelled by water vapor molecules between collisions, then the efficiency of the still would exceed fifty percent and approach a hundred percent as the number of molecules bouncing back toward the evaporator would decrease.

Close proximity surface stills are not, as a class, new in the art. However, most stills of this type do not lend themselves to continuous treatment of the condenser and evaporator surfaces. With continuous removal of the condensate from the condenser surface, a second efficiency factor is introduced. It is probable that this second efficiency factor exists by virtue of an extra attractive zone close to the condenser surface. This zone might well correspond to the viscous drag which occurs on the inner surface of a duct affecting the passage of fluids. At any rate there is a factor which causes reduced efficiency in condensers when an unbroken film of the condensate is formed on the condenser surface and the attraction of the condenser zone is neutralized. Accordingly, it is well known in the art that when this film is broken into a drop-like pattern, the efficiency of the condenser increases to as much as seven times the original efficiency.

It is therefore an object of the instant invention to provide, in a close proximity still, a condenser surface with immediate mechanical removal means for the condensate in order to preserve the efficiency of the device.

A second object of this invention is to provide in a still, an evaporator which need not be heated to the boiling point but which will operate with only a small differential in temperature between the evaporating and condensing surfaces. Such a still makes possible the ultilization of the temperature differences occurring naturally at various depths of the ocean as the sole source of the heating and cooling.

A still further object of this invention is to provide a low cost, light weight still capable of prolonged operation.

Briefly this invention comprises elongated belt-like evaporation and condensation surfaces separated by an elongated nonwetting screen separator, heating and cooling means for the evaporating and condensing surfaces respectively, saturating means for the evaporating surface, cleaning means for the evaporating surface, and means for removing the condensate from the condenser surface.

Other objects and advantages will be apparent to those skilled in the art upon reference to the following descriptions in the accompanying drawings in which.

Figure 1:
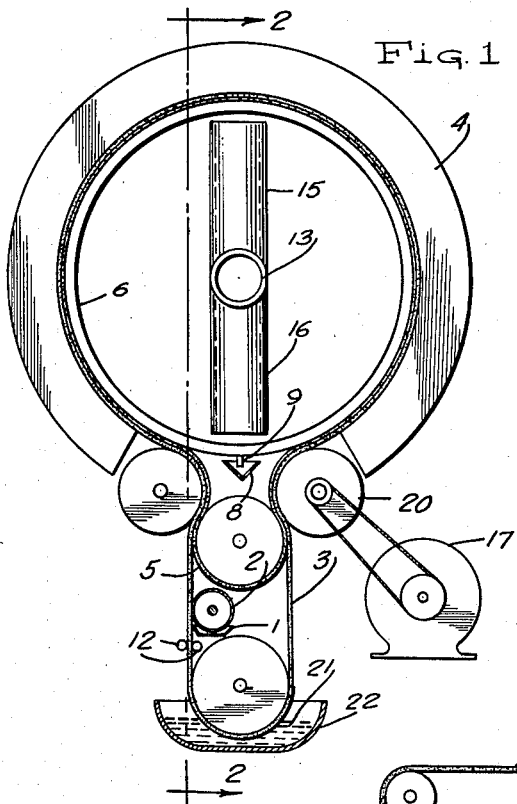
FIG. 1 is a vertical section of one embodiment of this invention.
Figure 2:
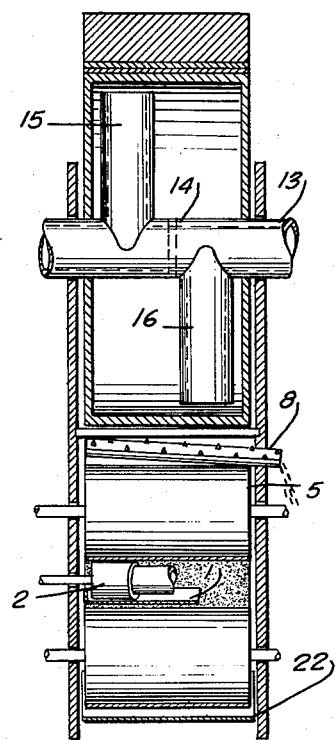
FIG. 2 is a vertical section of the same embodiment taken on line 2—2' of FIG. 1.

Referring in detail to the embodiment shown in FIGS. 1 and 2 of the attached drawings, rotating condenser drum 6 provides the condenser surface which is separated by endless screen separator 5 from the endless evaporator belt 3. The turning force for drum 6, separator 5, and evaporator belt 3 is provided by a motor driven roller 20 which, in this embodiment, is belt driven by electric motor 17. Evaporator surface belt 3 is a cloth belt which is saturated with the liquid to be distilled by contact with cloth covered roller 2 which is continually saturated with the liquid for distillation by being positioned in trough 1 containing the liquid for distillation. As evaporator surface belt 3 passes into the heat exchanger 4, it is warmed and gives off vapor which passes through separator 5 to the condenser drum 6. After a portion of belt 3 has passed through the heat exchanger, it is cleaned by immersion in cleansing bath 21 within trough 22. After cleaning, it passes between rollers 12 where the cleaning liquid is wrung from the belt. The interior of the exchanger 4 is provided with a cooling element shown in FIG. 2 comprising stationary tube 13 running through the center or axis of the drum and into which cooling water is introduced. Tube 13 is provided with barrier 14 which prevents the passage of the cool water through tube 13 and diverts the water through tube 16 into the interior of the drum. Drainage from the drum takes place through tube 15 back into tube 13 and out of the drum. Heat is provided to the exterior portion of drum 4 by any conventional heating means.

As stated above, the vapor passes from evaporation layer belt 3 through screen separator belt 5 to the condenser drum 6. Separator belt 5 is of such thickness as to separate evaporator layer belt 3 from condenser surface 6 by about one-quarter inch. The separator belt is, in this embodiment, composed of relatively widely spaced or open meshed screen which has a nonwetting treatment such as can be obtained by silicon dipping. The separator must be of a nonwetting variety in order to prevent the passage of the impure water to the condenser surface 6 by capillary action. The condensate, which forms on the outer surface of the rotating drum 6 (which is made of any suitable material), in droplet form, is squeegeed off by squeegee 9 and deposited in trough 8 for removal. Inasmuch as a given point on drum 6 will be subjected to the squeegee action at every turn of the drum, the formation of a solid film of water on condenser drum 6 is easily prevented, even where evaporation and condensation is rapid, simply by increasing the speed with which drum 6 is rotated.

Figure 3:
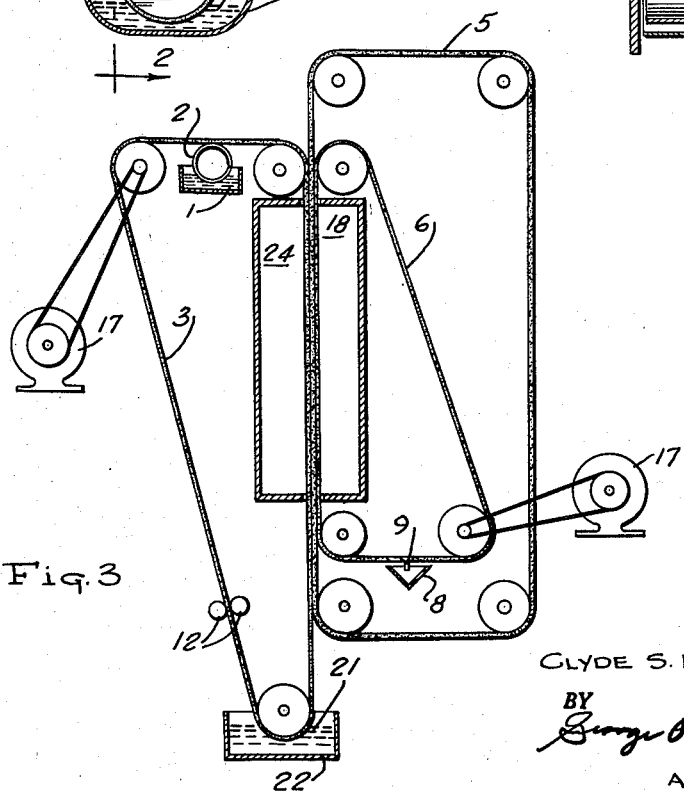
FIG. 3 is a diagrammatic sketch of a second embodiment of this invention.

FIG. 3 illustrates an alternate embodiment of this invention wherein an endless belt-like metallic surface is substituted as a condenser surface for the drum-like condenser described above. The operation of the embodiment shown in FIG. 3 is functionally identical to that of the embodiment shown in FIGS. 1 and 2. Labelling of FIG. 3 has been made to functionally correspond with that of FIGS. 1 and 2. It will be noted that the heat exchanger of the second embodiment is rectangular in shape rather than spherical, and is divided into a heating element 24 and a cooling element 18. The condensing surface 6 is in the form of an endless belt rather than drum-like as in the first embodiment. It will be noted that in FIG. 3, power is supplied to both evaporator belt 3 and condenser belt 6 by means of electrical motors 17. This dual source of rotating power is not essential inasmuch as the three belt elements are in contact with one another between rollers. However, it is desirable in order to alleviate the necesity of compressing too closely the evaporator and condenser belts. In all other respects the evaporation of the embodiment shown in FIG. 3 is identical to that shown at FIGS. 1 and 2.

It should be noted in connection with the above descriptions that this invention is useful in the conversion of saline to drinking water and readily lends itself to distillation of other substances as well. With respect to both embodiments shown, because of their great efficiency, heating means other than the standard heat pump or heat exchanger may also be used. The invention readily lends itself to heating by solar or radiant heat and in this case an additional plastic belt could be added to the system described in FIGS. 1 and 2, over evaporator belt 4 and in lieu of the heat exchanger.

I claim:

1. A close proximity still comprising a drum-type heat exchanger for introducing heat into the still, said heat exchanger surrounding a rotatable condenser element concentrically mounted with reference to said heat exchanger, said condenser element having internal fluid conduit means for removing heat from said condenser element, an endless fibrous belt evaporator wrapped substantially around and spaced from said condenser element by an open screen endless belt-type separator between said evaporator and said condenser element, evaporator saturating means comprising a distilland trough and a roller therein for transferring the distilland from said trough to said evaporator means for rotating said evaporator, said separator and said condenser element.

2. A close proximity still comprising a rotatable fluid cooled condenser element, an endless belt-like fibrous evaporator spaced from and wrapped substantially around said condenser element, an open screen endless belt-type separator between said evaporator and said condenser, a drum type heating element mounted concentrically with said condenser element and substantially enclosing said evaporator, separator and condenser, evaporator saturation means for saturating said evaporator with distilland and wiper means for removing distillate from the surface of said condenser means for rotating said evaporator, said separator and said condenser element.

3. In a close proximity still comprising a rotatably mounted fluid cooled condenser element, an endless belt-like fibrous evaporator spaced from and wrapped substantially around said condenser element, an open screen endless belt-like separator between said evaporator and said condenser, a open end drum-type heating element mounted concentrically with said condenser element and substantially enclosing said evaporator, separator and condenser, evaporator saturation means for saturating said evaporator with distilland, a second saturation means comprising a cleaning trough for said evaporator, wiper means for striking distillate from said condenser surface, said still being in open communication with the atmosphere through said open-end drum-type heating element, rotating means for rotating said evaporator, said separator and said condenser element.

4. A close proximity surface still comprising an elongated roller mounted fibrous or liquid absorbing endless belt-like rotative evaporator surface, a rotative condenser surface having a portion thereof in direct contact with an elongated roller mounted endless belt-like rotative separator positioned between said evaporator surface and said condenser surface, means for creating a differential temperature between said evaporator surface and said condenser surface a part of said means comprising an open-end drum-type heating element, distilland saturation means for said evaporator surface, distillate collection means operating to remove distillate from said condenser surface, a second saturation means effecting a cleaning means for said evaporator surface, rotating means for said evaporator, said separator and said condenser surface, said still being in open communication with the atmosphere through said open-end drum-type heating element, rotating means for rotating said evaporator, said separator and said condenser element.

References Cited by the Examiner

UNITED STATES PATENTS

| 2,073,327 | 3/37 | Vigers. | |
| 2,109,129 | 2/38 | Fawcett et al. | 202—205 |
| 2,150,684 | 3/39 | Hickman. | |
| 2,180,050 | 11/39 | Hickman | 202—236 X |
| 2,530,376 | 11/50 | Castle et al. | 202—236 |
| 3,004,901 | 10/61 | Nerge et al. | 202—236 X |
| 3,090,732 | 5/63 | Pinkwart et al. | 202—236 |
| 3,111,461 | 11/63 | Hickman. | |

FOREIGN PATENTS 872,192 7/61 Great Britain.

NORMAN YUDKOFF, *Primary Examiner.*

GEORGE D. MITCHELL, *Examiner.*